United States Patent

Cook

[11] 3,774,019
[45] Nov. 20, 1973

[54] CORRELATION SYSTEM WITH RECIRCULATING REFERENCE SIGNAL FOR INCREASING TOTAL CORRELATION DELAY

[75] Inventor: Charles E. Cook, Carlisle, Mass.

[73] Assignee: Sperry Rand Corporation, New York, N.Y.

[22] Filed: Sept. 20, 1971

[21] Appl. No.: 181,898

[52] U.S. Cl. ............... 235/181, 330/5.5, 343/17.1, 343/100 CL
[51] Int. Cl. ............................................ G06g 7/19
[58] Field of Search ................... 235/181; 343/17.1, 343/100 CL; 330/5.5; 307/88.3

[56] References Cited
UNITED STATES PATENTS

| | | | |
|---|---|---|---|
| 3,463,911 | 8/1969 | Dupraz et al. | 235/181 |
| 3,665,413 | 5/1972 | Walsh et al. | 235/181 X |
| 3,599,209 | 8/1971 | Goodrich | 235/181 X |
| 3,592,182 | 7/1971 | Menard | 235/181 X |
| 3,419,867 | 12/1968 | Pifer | 343/100 CL |
| 3,660,841 | 5/1972 | Powers et al. | 343/17.1 R |
| 3,670,151 | 6/1972 | Lindsay et al. | 235/181 |
| 3,529,142 | 9/1970 | Robertson | 235/181 |

OTHER PUBLICATIONS

Tien: Parametric Amplification and Frequency Mixing in Propagating Circuits, Journal of Applied Physics, Vol. 29, No. 9, Sept. 1958.

*Primary Examiner*—Felix D. Gruber
*Attorney*—S. C. Yeaton

[57] ABSTRACT

A correlation system includes a delay line correlator comprising two tapped delay lines where an input signal and a reference signal are applied to the lines, respectively, such that the signals scan past each other at a relative velocity with respect to each other for obtaining the correlation function therebetween. Means are included in the system for repetitively inserting the reference signal into the correlator for increasing the total correlation delay time thereof.

9 Claims, 5 Drawing Figures

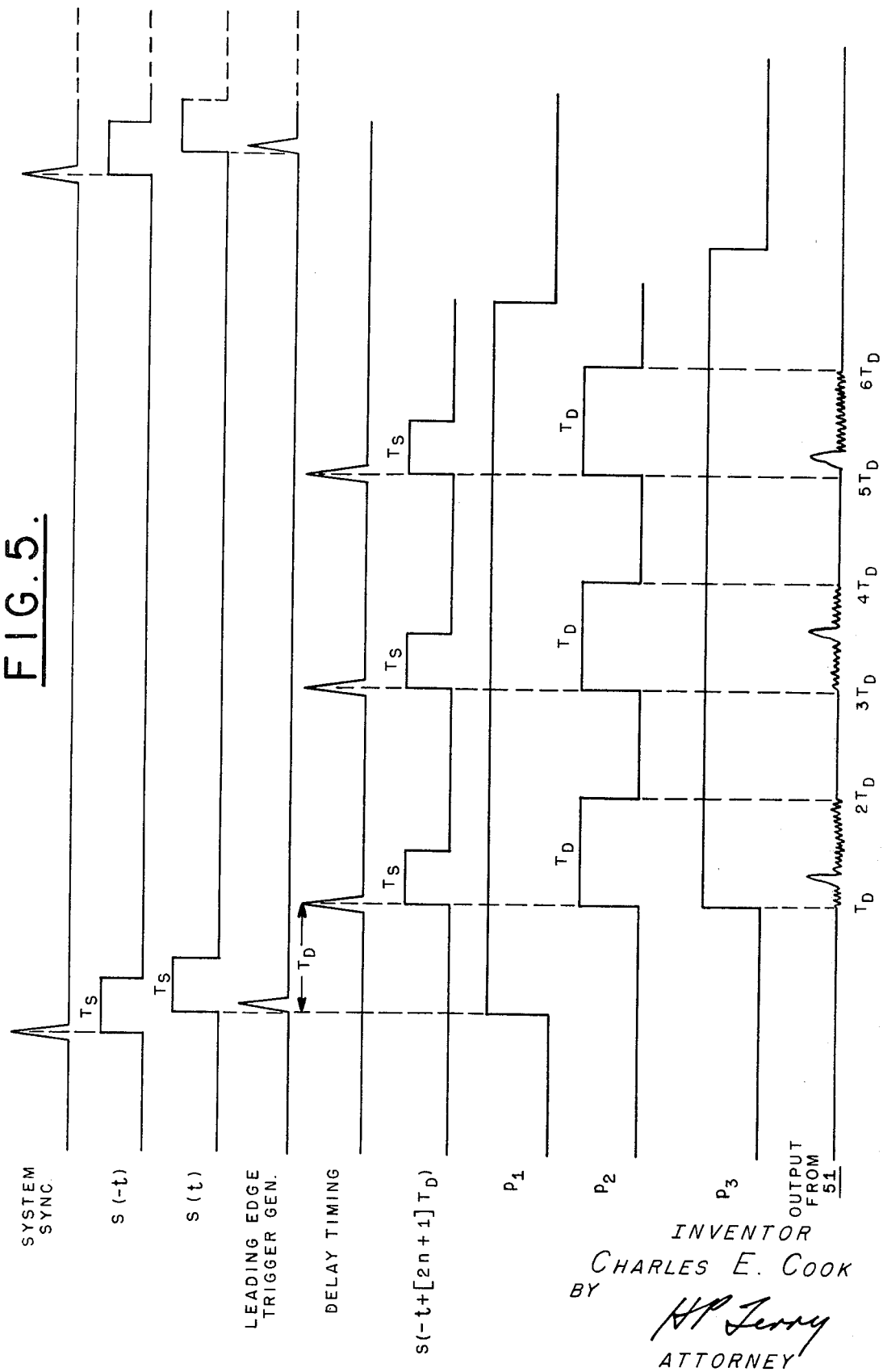

CORRELATION SYSTEM WITH RECIRCULATING REFERENCE SIGNAL FOR INCREASING TOTAL CORRELATION DELAY

BACKGROUND OF THE INVENTION

1. Field of the Invention

The invention relates to systems for providing the correlation function between an input signal and a reference signal particularly with regard to target ranging systems.

2. Description of the Prior Art

Target ranging systems such as, for example, radar systems are known in which a signal is transmitted and reflected from a target, the total transit time of the signal from the transmitter to the receiver providing a measure of the range to the target. Correlation devices have been utilized in such systems to enhance the signal to noise ratio of the target return signals. In such correlation devices a replica of the transmitted signal is stored in a temporally or spatially stationary manner and the input signal from the receiver is correlated therewith over the entire range of interest of the system. In such systems, it is often difficult to alter the stored reference so as to accommodate expected distortions in the return, i.e., from doppler shift, or to enable changing the transmitted signal for, for example, coding or covert transmission purposes.

A deltic correlator may also be utilized in such systems. A deltic correlator is a digital device of the type wherein the reference signal is stored in a temporally stationary manner. Between sampling intervals of the input signal, the bits of the reference and the bits of the input signal are circulated in the same direction past a circuit that provides the bit by bit comparison therebetween required in obtaining the correlation function. After the circulation the bits of the reference are returned to their initial position and the input signal is then shifted by one bit position. Thus, it will be appreciated that the deltic correlator requires complex clocking and timing circuits so as to generate the correlation function and provide a useful display thereof.

Correlation devices are also known wherein an input signal and a reference signal are scanned relative to each other where the two signals propagate in opposite directions through the device. Absent the present invention, these devices are not particularly well suited to target ranging systems of the type described since the measurable range interval would be limited by the delay time through the device. Delay times of available delay devices are of such magnitude so as to provide an extremely limited operable range for such systems.

Microwave acoustic delay line correlators of this type are known that possess the advantages of small size and relative simplicity. These devices, of course, suffer from the disadvantages herein discussed. Such a device is described in Vol. 16, No. 12 of Applied Physics Letters of June 15, 1970, on page 494 in the C. F. Quate and R. B. Thompson letter, "Convolution and Correlation in Realtime with Non-Linear Acoustics." For such a device, correlation is performed by propagating the two signals in the same direction through the device at different velocities with respect to each other. Since the correlation is performed effectively between dissimilar signals, a maximum correlation output does not result. Furthermore, when the two signals are propagated through the device in opposite directions at the same speed with respect to the medium, the convolution function therebetween is obtained providing a substantially smaller output than that produced when correlation is performed.

SUMMARY OF THE INVENTION

The present invention obviates the hereinabove described disadvantages of the prior art devices by providing a correlator system wherein the input signal and the reference signal are scanned past each other at a relative velocity with respect to each other thereby obtaining the correlation function therebetween. Means are included in the system for repetitively inserting the reference signal into the correlation device to increase the total correlation delay time thereof, thereby providing an arbitrarily long operable range for a target ranging system in which the device may be utilized.

Where required, means are included to invert the time scale of one of the two signals being correlated such that propagation in opposite directions, respectively, of the two signals provides the correlation function rather than the convolution function as desired.

BRIEF DESCRIPTION OF THE DRAWINGS

FIG. 5 is a waveform timing diagram illustrating waveforms at various points of FIG. 4.

DESCRIPTION OF THE PREFERRED EMBODIMENT

Figure 1:
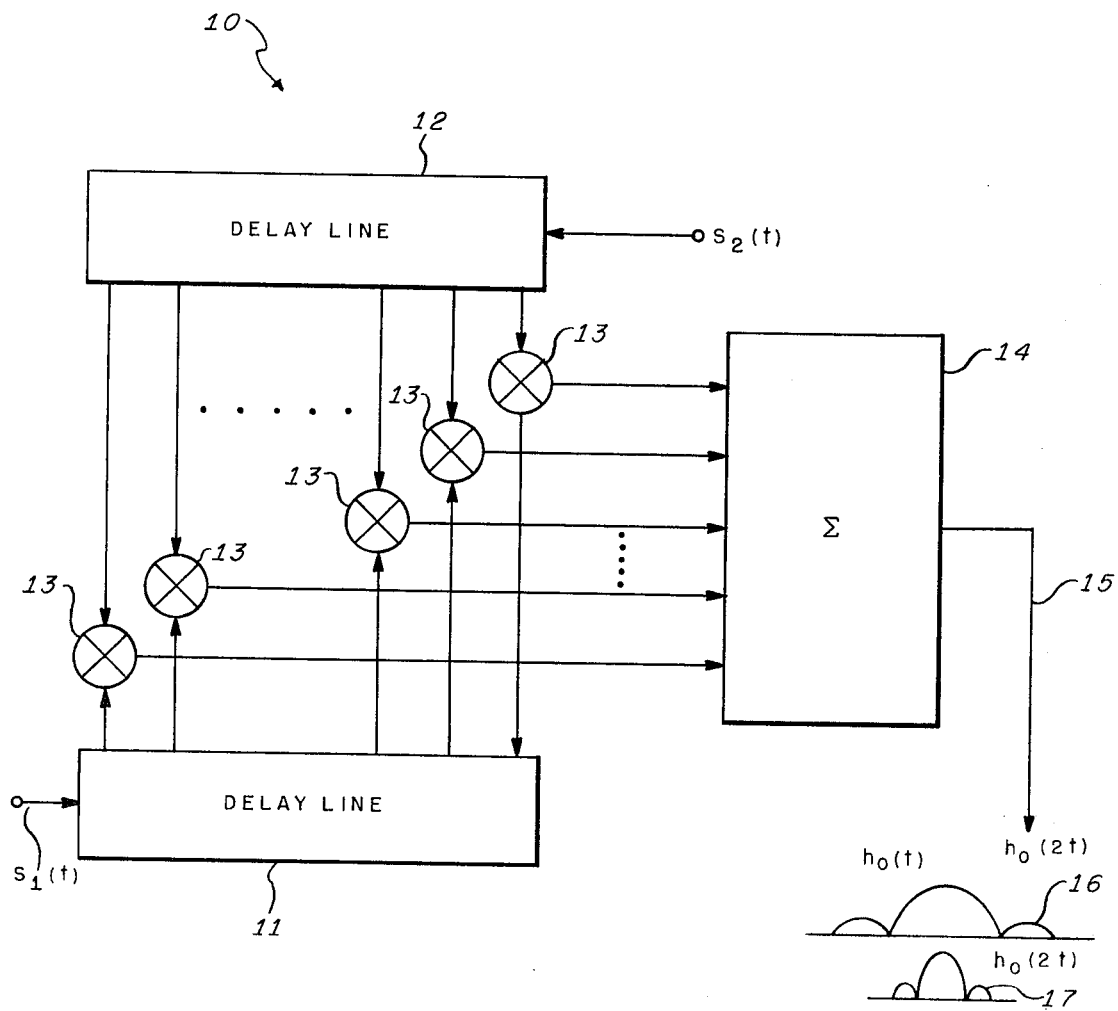
FIG. 1 is a schematic block diagram of a delay line correlator of a type that may be used in the correlation system of the invention.

Referring to FIG. 1, a delay line correlator 10 of a type that may be used in the correlation system of the invention is illustrated. The delay line correlator 10 is comprised of tapped delay lines 11 and 12 having signals $S_1(t)$ and $S_2(t)$ applied to the inputs thereof, respectively. Each tap of the delay line 11 is applied as an input to a multiplier 13, the other input of which is provided by the corresponding tap of the delay line 12. The output of the multipliers 13 are applied as inputs to a summing network 14 that provides the output of the device $h_o(2t)$ on a lead 15.

It will be appreciated that the arrangement of the components of FIG. 1 is a conventional configuration for providing the convolution function or the correlation function between the signals $S_1(t)$ and $S_2(t)$ in accordance with the manner in which the signals are applied to the delay lines 11 and 12. The delay line correlator 10 may be considered as a discrete component model of the microwave acoustic correlation and convolution device of the said Quate and Thompson letter in which the taps of the delay lines 11 and 12 are very closely spaced, i.e., $\Delta t_{tap} < 1/\text{highest frequency component}$ of the signal. When the signals $S_1(t)$ and $S_2(t)$ are applied at opposite ends of the Quate and Thompson device so that the respective acoustic waves are propagating in opposite directions in the medium and with velocities of equal magnitude, the non-linear interaction between the waves within the medium results in an output: $h_o(2t) \sim \int S_1(\tau)S_2(2t-\tau) \, d\tau$ which represents the convolution of $S_1(t)$ and $S_2(t)$, except for the scale factor of 2 with regard to the parameter t. This scale factor has the effect of halving the time dimension of the output signal. It is thus appreciated that with the signals $S_1(t)$ and $S_2(t)$ applied to opposite ends of the respective delay lines 11 and 12 of FIG. 1, the output $h_o(2t)$ on the lead 15 will be the convolution of the input signals. FIG. 1 also illustrates curves 16 and 17 representative of the output of a device in which one of the signals is stationary and the output of a device such as the delay line correlator 10, respectively. The time compression factor of 1/2 of the waveform 17 with respect to the waveform 16 is depicted for clarity.

It is conventional practice with devices such as illustrated in FIG. 1, or with microwave acoustic devices such as the aforesaid Quate and Thompson device, to provide the correlation function between the two signals $S_1(t)$ and $S_2(t)$ by applying the signals to the same end of the device such that they travel in the same direction through the medium but with different propagation velocities with respect to each other to provide the relative scanning therebetween required for correlation. In devices of the microwave acoustics variety, one of the signals may be propagated as a longitudinal wave and the other as a shear wave thereby providing the relative velocities therebetween. Because of the different velocities of the two propagating waves, the correlation is effectively between dissimilar signals and thus does not provide a maximum correlation output. This is undesirable in signal processing systems where maximum signal enhancement is required for efficacious operation.

Devices of the type discussed conventionally provide the convolution of the signals $S_1(t)$ and $S_2(t)$ by applying these signals to opposite ends of the device such that the resulting waves propagate through the medium in opposite directions and with equal velocities thus providing the convolution function as previously discussed. As is well known, the convolution between two signals normally is of a smaller magnitude than the correlation therebetween and thus is not as useful a function as correlation for signal processing applications for the reasons given above.

Devices of the type described above may be utilized to provide the correlation function between the two signals $S_1(t)$ and $S_2(t)$ by applying the signals to opposite ends of the device such that the resulting wave propagates at the same velocity but in opposite directions relative to each other and inverting the time scale of one of the two signals.

Figure 2:
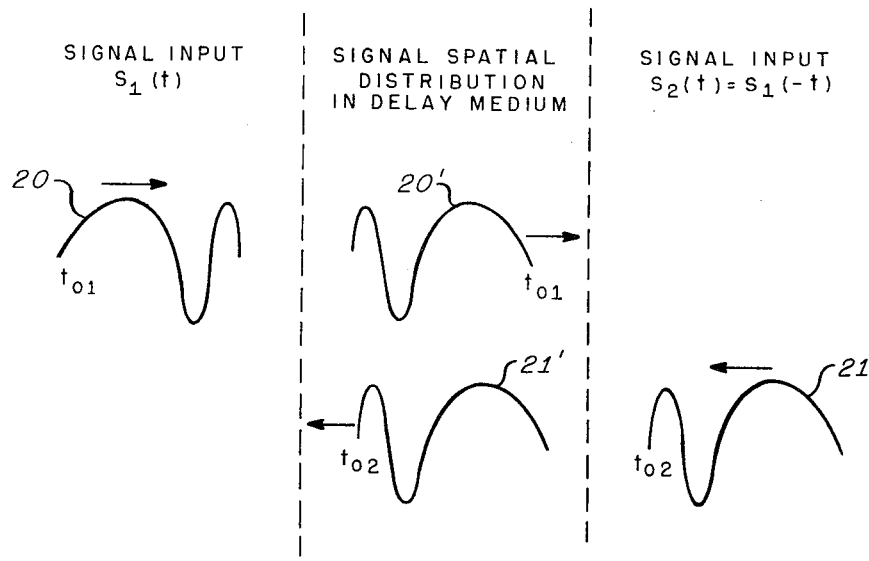
FIG. 2 is a schematic representation of temporal and spatial waveform distributions useful in explaining the operation of FIG. 1.

Referring now to FIG. 2, schematic representations of temporal and spatial distributions of the waveforms $S_1(t)$ and $S_2(t)$ are illustrated with respect to the delay medium of the aforedescribed devices. The signal $S_1(t)$ indicated at 20 is applied to one end of the delay medium. The waveform 20 is illustrated as a stylized frequency modulated signal. The required time scale inversion is effected with respect to the signal $S_2(t)$ by utilizing $S_2(t) = S_1(-t)$ as illustrated at 21. The waveform 21 is then applied to the other end of the delay medium. Within the delay medium the waveforms 20 and 21 now have identical spatial distributions so that $S_2(t)$ may be considered as a reference signal identical within the medium to the input signal $S_1(t)$ and scanning past it. Thus, for this situation, the non-linear interaction of the two signals within the medium provides a correlation output $h_o(2t) \sim \int S_1(\tau)S_2(-2t+\tau) \, d\tau$ which is desired for signal processing applications for the reasons discussed.

It will be appreciated that in many applications where even function signals such as pulse trains are utilized, the correlation and convolution functions provide identical results except for the sign of the time axis. Generally, however, for radar or communication systems, the complex signals utilized do not exhibit this type of symmetry so that the convolution and correlation functions do not result in similar output signals. For these types of waveforms, the correlation output is the more desirable of the two to provide maximum signal to noise ratios. Complex signals of this type are described in the textbook, "Radar Signals" by C. E. Cook and M. Bernfeld published in 1967 by the Academic Press.

It will be appreciated with regard to FIG. 2 that when the two signals $S_1(t)$ and $S_2(t)$ are applied to the same end of the delay medium without time inversion so as to effect correlation therebetween, as previously described, and since one of the waves travels at a faster velocity than the other wave, the two signals are not spatially commensurate within the medium and the resulting correlation is effectively between dissimilar signals thus not providing a maximum correlation output as previously discussed. It may further be appreciated that when the two signals are applied to the opposite end of the medium without time inversion for providing the convolution therebetween as previously discussed, the two waveforms within the medium are again not spatially commensurate unless the waveforms are special symmetrical signals.

It is desirable to utilize correlation devices in target detection systems such as radar for enhancing the signal to noise ratio of the returns from the targets. Devices of the type described above provide a limited operable range since the total range delay over which correlation may be performed is limited by the total delay of the device. Particularly, the microwave acoustic correlator described above is similarly limited but can provide the same type of processing as the discrete component correlator 10 of FIG. 1 but with a much smaller structure. In accordance with the principal concept of the present invention, this limitation is overcome by providing means for successively re-inserting the reference signal at accurately timed intervals to permit the device to correlate signals over a substantially longer range delay interval than the intrinsic delay of the structure.

In order to utilize the above-described correlation devices as range processors, the intrinsic delay of the device should be sufficiently long so that more than one serially time-distributed range bin may simultaneously be contained in the delay medium. This is required so that every target return will be scanned by a reference signal.

Figure 3:
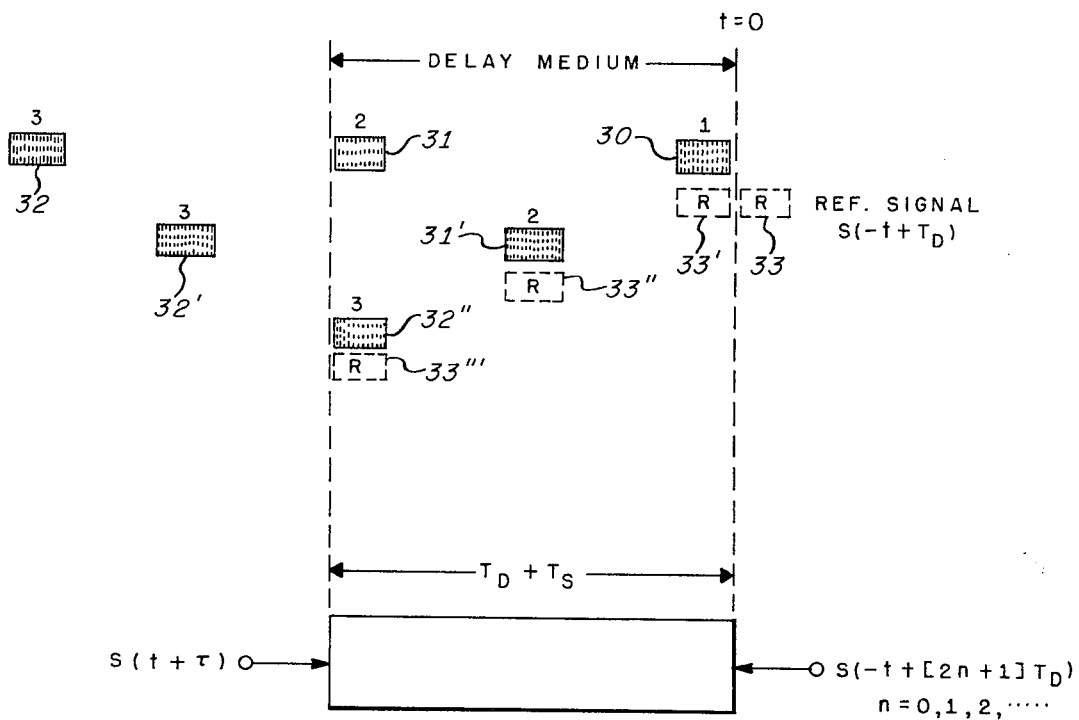
FIG. 3 is a schematic representation of temporal and spatial waveform distributions with respect to the delay medium of FIG. 1 useful in explaining the application of the invention to target ranging systems.

Referring to FIG. 3, a schematic representation of temporal and spatial waveform distributions with respect to the delay medium of the devices hereinabove described, is illustrated. Three consecutively arriving target return signals 30, 31 and 32 are depicted where the delay time of the medium is sufficiently long to simultaneously accommodate returns 30 and 31, which length is designated as $T_d + T_s$ for reasons to be discussed. The reference signal 33 is delayed in a manner to be described so as to enter the line when the return 30 is about to exit therefrom so that there isn't any portion of the delay medium that is not used for input signal correlation. As depicted, the reference 33 scans past the three target returns 30, 31 and 32 at the time intersections indicated at 33', 33'' and 33''', respectively, to effect correlation therebetween.

As previously described, because the input signal and the reference signal are traveling through the medium in opposite directions at the same velocity magnitudes, the correlation output signal is compressed in time by a factor of 2. Because of this, if the device delay time $T_d$ is substantially greater than the signal duration $T_s$, then the device is capable of processing the signals that are contained within a range interval $2T_d$. Thus, in practicing the invention the reference signal should be re-inserted into the delay medium preferably at every other interval $T_d$ so that ambiguities are not generated by the same target return correlating with two consecutively inserted reference signals. Thus it is appreciated that by repetitively re-inserting the reference signal at every other interval $T_d$, the contiguous range intervals of duration $2T_d$ may be processed by the device in accordance with the invention. Because of the time scale change factor, all signals contained in an interval $2T_d$ at the device input, will occupy an interval of $T_d$ at the device output. Thus if by means of re-inserting the reference signal, signals occupying an interval $2NT_d$ are processed, then the processed output will comprise contiguous intervals of duration $T_d$ alternately containing processed signals and no signal, in a manner to be further explained. It will be appreciated that although the delay time for the medium must be at least long enough to simultaneously accommodate two contiguous range bins, the line may be arbitrarily long and it is designated as having a length of $T_d + T_s$ where $2T_d$ is the time duration between reinsertions of the reference and $T_s$ is the length of the input signal as well as the length of the reference signal.

Figure 4:
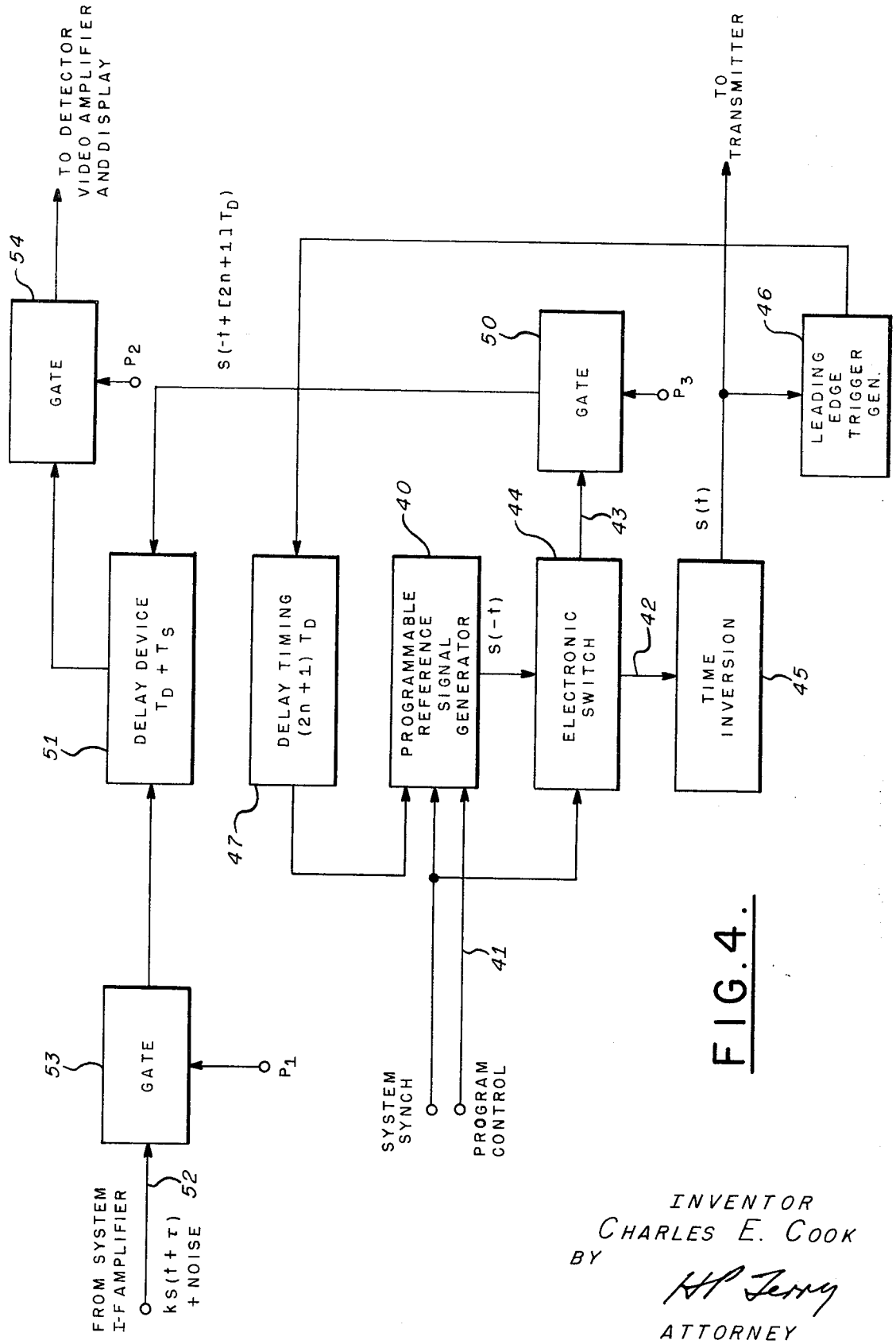
FIG. 4 is a schematic block diagram of a portion of a target ranging system and embodies a correlation system incorporating the concepts of the present invention.

Referring now to FIGS. 4 and 5, a schematic block diagram of the correlation processing system of a target ranging system incorporating the concepts of the present invention and a waveform timing diagram of signals at various points of FIG. 4, are illustrated, respectively. A system sync pulse from the target ranging system is applied to trigger a programmable reference signal generator 40. The signal generator 40 is also responsive to a program control signal on a lead 41 for controlling the type of signal provided thereby. The programmable reference signal generator 40 is of a conventional type well known in the radar and communications art for providing a finite duration signal $S(-t)$. The signal $S(-t)$ may be any one of a wide variety of known signals such as swept FM phase codes and pulse trains. The signal generator 40 may also be of a type described in the said Cook and Bernfeld textbook that provides a pulse compression signal having a signal time-bandwidth product or compression ratio of $T_s W_s$, where $W_s$ is the signal bandwidth. When a signal of this type is provided, the number of independent range cells that may be examined at the delay line correlator output is given by $2T_d T_s W_s/T_s$ or $2T_d W_s$. For example, if the signal time-bandwidth product is 100 and the total delay of the device is $6T_s$, so that $T_d = 5T_s$, then each output signal interval will contain information from 1,000 range cells, each of width $1/W_s$.

The programmable reference signal generator 40 may alternatively be of a digital design of the type described in U.S. Pat. application Ser. No. 1,090 filed Jan. 7, 1970, "A Digital Waveform Generator," by A. W. Crooke and M. E. Hanna, Jr. now U.S. Pat. No. 3,633,017 issued Jan. 4, 1972 and assigned to the assignee of the present invention.

The output of the signal generator 40 is selectively applied to either a lead 42 or a lead 43 via an electronic switch 44 in response to the system sync signal. The system sync signal conditions the electronic switch 44 so that the first occurrence of the signal $S(-t)$ is applied to the lead 42 and subsequent occurrences thereof are applied to the lead 43 until the appearance of the next system sync pulse.

The lead 42 provides the input to a time inversion circuit 45 whose output is the time inverted finite duration signal $S(t)$. When $S(-t)$ is a signal with linear or odd symmetric frequency modulation, then $S(t)$ may be derived from $S(-t)$ in a conventional manner by the well known side-band inversion technique disclosed in U.S. Pat. No. 3,400,396 issued Sept. 3, 1968, "Pulse Stretching And Compression Radar System," by C. E. Cook and C. E. Brockner and assigned to the assignee of the present invention.

Other classes of waveforms, with for example complex phase modulation characteristics of the type described in the said Cook and Bernfeld textbook may be synthesized using digital signal generation methods which are readily adaptable to digital storage and reverse readout to obtain the desired time inversion. Accordingly, the device disclosed in said patent application Ser. No. 1,090 is an example of such digital apparatus and would in fact encompass the programmable reference signal generator 40 as well as the time inversion circuit 45.

The output $S(t)$ from the time inversion circuit 45 is sent to the radar transmitter (not shown) to be radiated in a conventional manner for reflection from targets within the range of the system. The signal $S(t)$ from the time inversion circuit 45 is also applied to a leading edge tigger generator 46 which provides a pulse upon the occurrence of the leading edge of $S(t)$ in a conventional manner. It will be appreciated that the time inversion circuit 45 may introduce some delay in providing its output $S(t)$ from its input $S(-t)$ as illustrated in FIG. 5. It is therefore appreciated that the system timing is referenced to the output of the leading edge trigger generator 46, i.e., to the leading edge of the transmitted signal $S(t)$, in a manner to be described.

The output of the leading edge trigger generator 46 is applied to a delay timing circuit 47 which is triggered by the output of the leading edge trigger generator 46 to provide a train of pulses at intervals of $(2n+1)T_d$. These pulses therefore occur at intervals $T_d, 3T_d, 5T_d$, etc. The delay timing circuit 47 is of conventional design and may be instrumented as a binary counter that is triggered by the leading edge trigger generator 46 and whose overflow signals provide the designated pulses to the programmable reference signal generator 40.

The output of the delay timing circuit 47 is applied as an input to the programmable reference signal generator 40 wherein for each pulse received the signal generator 40 provides the signal $S(-t)$ to the electronic switch 44. It is therefore appreciated that the electronic switch 44 provides the signal $S(-t)$ on the lead 42 to the time inversion circuit 45 in response to the systems sync signal and thereafter provides the signal $S(-t)$ on the lead 43 in response to the pulses from the delay timing circuit 47.

The lead 43 signal is applied as an input to a gate 50 which also receives a control signal $P_3$ as illustrated in FIG. 5 as a second input thereto. The outputs of the gate 50 are therefore the signals $S(-t)$ triggered by the delay timing circuit 47 which propagate through the gate 50 in the presence of the pulse $P_3$. This gate 50 output may be designated as $S(-t + [2n + 1] T_d)$ as indicated by the legend.

The output of the gate 50 is applied as the reference input signal to a delay correlation device 51 which may be of the type discussed above with regard to FIG. 1 or may be of the microwave acoustic variety of the type discussed with respect to the said Quate and Thompson letter. The correlator 51 may also be instrumented in digital form with shift register delay lines in a manner well understood in the art.

The target returns of the $S(t)$ signal that was transmitted as previously described are received and applied to a lead 52 from the system i.f. amplifier. The target returns of the finite duration $S(t)$ signal are received at arbitrary arrival times within the predetermined range time interval of the target ranging system. The duration of the finite duration signal is small compared to the predetermined range time interval as seen in FIG. 5. The received signal may be designated as $KS(t + \tau) +$ noise where K is a range attenuation factor and $\tau$ is the delay to a target from which the signal has been reflected. The target returns on the lead 52 are applied as an input to a gate 53 which receives a $P_1$ control signal as illustrated in FIG. 5 at a second input thereto. The control signal $P_1$ is initiated in response to the output of the leading edge trigger generator 46 and therefore renders the gate 53 conductive at the leading edge of the radar transmission in anticipation of target returns.

The output of the gate 53 is applied as the input signal to the delay line correlator 51 for correlation therein with the reference signal from the gate 50 in the manner previously described.

The output from the correlation device 51 is applied to a gate 54 which also receives control signal $P_2$ as illustrated in FIG. 5 at the second input thereto. The output of the gate 54 provides the signal for the detector, video amplifier and display portion of the target ranging system not shown for simplicity.

In operation, a system sync pulse sets the electronic switch 44 to provide its output on the lead 42. The system sync pulse also triggers the reference signal generator 40 to provide the signal $S(-t)$ to the time inversion circuit 45 which, in turn, provides the inverted signal $S(t)$ to the transmitter. The electronic switch 44 is configured to thereafter connect the signal $S(-t)$ to the lead 43 for application to the gate 50. The leading edge of the transmission causes the leading edge trigger generator 46 to provide a pulse to the delay timing circuit 47 that in turn provides pulses at the intervals $T_d, 3T_d, 5T_d$, etc. These triggers from the delay timing circuit 47 cause the programmable reference signal generator 40 to provide the reference signal $S(-t)$ through the gate 50 as the correlation reference for the delay line correlating device 51. It is appreciated that since the reference $S(-t)$ is time inverted by the time inversion circuit 45 before transmission, the reference signal from the gate 50 will be the time inverse of the input signal from the gate 53 therefore performing correlation as described above.

It will be appreciated that the return from a target at zero range will reach the end of the delay line into which it was inserted at the interval $T_d$ after the leading edge trigger from the circuit 46. Since the first delay timing pulse from the circuit 47 sends the reference signal into the device 51 at this time, full utilization of the delay medium is achieved for input correlation as previously described. Since the total delay for the medium is $T_d + T_s$ and the reference signal is reinserted therein at the intervals $(2n + 1) T_d$, there isn't any loss of correlated signal response when the reference signal is at the point at maximum delay before exiting the medium. The timing of $P_2$ then eliminates from the output display any partially correlated signal resulting from the reference signal being partially within the medium such as when it is just entering or just exiting the medium. The returns corresponding to these eliminated partially correlated signals are then fully correlated by the next re-insertion of the reference at which time the $P_2$ control signal passes the processed signals through the gate 54 to the output.

Because of the 2 to 1 time compression of the delay correlator 51 as previously discussed, the output therefrom is comprised of alternate intervals of duration $T_d$ of processed signal and no-signal as illustrated in FIG. 5 and as transmitted through the gate 54 by the control signal $P_2$. It is appreciated that during the intervals of no-signal other operations such as frequency analysis may be performed. It is furthermore appreciated that because of the time-scale change, it is necessary for any amplifying or processing circuits that receive their input from the gate 54 to have essentially twice the bandwidth of the original input signal $S(t)$.

After sufficient re-insertions of the reference signal from the gate 50 to cover the range of interest for the system, the gates 50, 53 and 54 are closed a short time prior to the next system sync pulse to allow all signals to settle out.

It will be appreciated that the delay line correlator 51 may be designed to impart pulse compression to the target return signals as discussed above, and the programmable reference signal generator designed to impart the complementary pulse expansion to the transmitted signals in the manner discussed in the said Cook and Bernfeld textbook. It will be appreciated that the timing and gating pulses illustrated in FIG. 5 are readily obtainable from conventionally designed circuits that are not shown for simplicity.

Since the processor disclosed hereinabove does not depend for its operation of any specific signal format or modulation, the reference signal applied to the correlator 51 may be altered as a function of expected variations in the parameters of the received signal as a function of range or frequency. For example, the reference signal may be identical to the transmitted signal except for a doppler frequency shift. A number of all-range processors may be operated in parallel as a means of identifying a specific doppler shift, the reference signals for each processor differing only in their doppler shift parameters. The reference signal may be varied as a function of range to reflect various detection conditions. As an example, if the transmission is a rectangular envelope linear FM signal, the replica signal for near ranges would also be a rectangular envelope, full duration signal to achieve optimum processing gain in clutter or reverberation which tends to predominate at near ranges. At far ranges, the envelope of the signal may be tapered and truncated to achieve a processor output with low range sidelobes so as not to obscure small signals that are above the noise level but which are smaller in amplitude than a larger signal at approximately the same range. A similar type of reference signal variation as a function of time may be used in a communication application that employs signal coding within a frame time. By means of the changes in the signal structure, different frame times may be allocated to different users.

It will be appreciated that an alternative arrangement for the apparatus of FIG. 4 may be realized by connecting the lead 42 directly to the leading edge trigger generator 46 and to the transmitter and inserting the time inversion circuit 45 in the lead 43. With this embodiment, the programmable reference signal generator 40 may be instrumented to provide S(t) which will be transmitted and the time inversion circuit 45 will provide S(−t) through the gate 50 to the delay correlator device 51.

While the invention has been described in its preferred embodiment, it is to be understood that the words which have been used are words of description rather than limitation and that changes may be made within the purview of the appneded claims without departing from the true scope and spirit of the invention in its broader aspects.

I claim:

1. A correlator system for correlating a finite duration input signal with a corresponding finite duration reference signal, said input signal having an arbitrary arrival time in a predetermined time interval and a small duration compared to said time interval, comprising correlator means having a correlation delay time substantially less than said predetermined time interval and responsive to said signals for propagating both said signals through said correlator means in opposite directions with respect to each other for scanning said signals past each other at a relative velocity with respect to each other to obtain the correlation function therebetween, and means for repetitively inserting said finite duration reference signal into said correlator means for increasing the total correlation delay time of said correlator means to provide a correlation peak with respect to said input signal in accordance with said arbitrary arrival time.

2. The system of claim 1 in which said correlator means includes first and second delay line means for effectively propagating both said input signal and said reference signal, respectively, past each other.

3. The system of claim 2 in which said means for repetitively inserting includes means for inserting said reference signal into said correlator means at intervals related to twice the delay time of said delay line means.

4. The system of claim 1 in which said correlator means comprises a microwave acoustic correlator.

5. The system of claim 1 further including means for time inverting one of said signals prior to application to said correlator means.

6. A correlator system for use in a target ranging system having a predetermined range time interval and including a signal source for providing a first finite duration signal of small duration compared to said time interval and means for time inverting said first signal to providing a second finite duration signal, said target ranging system transmitting one of said first and second signals and receiving return signals thereof reflected from said targets at arbitrary arrival times in said time interval, said correlator system comprising correlator means having a correlation delay time substantially less than said predetermined time interval and responsive to said return signals and to the other of said first and second signals for propagating both said signals through said correlator means in opposite directions with respect to each other for scanning said signals past each other at a relative velocity with respect to each other to obtain the correlation function therebetween, and means for repetitively inserting said other signal into said correlator means for increasing the total correlation delay time of said correlator means to provide correlation peaks with respect to said return signals in accordance with said arbitrary arrivel times.

7. The correlator system of claim 6 in which said correlator means includes first and second delay line means for effectively propagating both said return signal and said other signal, respectively, past each other.

8. The correlator system of claim 7 in which said means for repetitively inserting includes means for inserting said other signal into said correlator means at intervals related to twice the delay time of said delay line means.

9. The correlator system of claim 6 in which said correlator means comprises a microwave acoustic correlator.

* * * * *